(12) United States Patent
Wittmer et al.

(10) Patent No.: US 9,027,635 B2
(45) Date of Patent: May 12, 2015

(54) HEAT EXCHANGE SURFACE INCLUDING A HYDROPHOBIC COATING LAYER

(75) Inventors: Douglas Wittmer, Upton, MA (US); Joseph Kareh, Westwood, MA (US); Theodore D. Ciolkosz, Milton, MA (US); Joseph A. Jarrell, Newton Highlands, MA (US)

(73) Assignee: Waters Technologies Corporation, Milford, MA (US)

( * ) Notice: Subject to any disclaimer, the term of this patent is extended or adjusted under 35 U.S.C. 154(b) by 2457 days.

(21) Appl. No.: 11/573,906

(22) PCT Filed: Aug. 24, 2005

(86) PCT No.: PCT/US2005/030604
§ 371 (c)(1),
(2), (4) Date: Oct. 10, 2008

(87) PCT Pub. No.: WO2006/024032
PCT Pub. Date: Mar. 2, 2006

(65) Prior Publication Data
US 2009/0159751 A1    Jun. 25, 2009

Related U.S. Application Data

(60) Provisional application No. 60/603,930, filed on Aug. 24, 2004.

(51) Int. Cl.
*F28F 13/18* (2006.01)
*C09K 3/18* (2006.01)
(Continued)

(52) U.S. Cl.
CPC .............. *F25D 21/04* (2013.01); *B64D 15/00* (2013.01); *F25B 21/02* (2013.01); *F28F 19/006* (2013.01); *F28F 2245/04* (2013.01)

(58) Field of Classification Search
CPC ........... F28F 13/00; F28F 13/04; F28F 13/18; F28F 13/182; F28F 13/185; F28F 13/187; F28F 19/00; F28F 19/02; F28F 19/04
USPC ................... 165/133; 106/13; 138/145, 146; 252/381, 383, 384; 428/409
See application file for complete search history.

(56) References Cited

U.S. PATENT DOCUMENTS 3,429,846 A    2/1969  Betchtold et al.
4,473,473 A *  9/1984  Cheng ............................ 203/10
(Continued)

FOREIGN PATENT DOCUMENTS

JP    10-047890 A    2/1998
JP    10-132483      5/1998
(Continued)

OTHER PUBLICATIONS

Combined Search and Examination Report for patent application GB0703668.4, dated Feb. 28, 2008, 5 pages.
(Continued)

*Primary Examiner* — Ljiljana Ciric
(74) *Attorney, Agent, or Firm* — Waters Technologies Corporation

(57) ABSTRACT

A device for withdrawing heat energy from air. The device includes a layer of a substantially hydrophobic coating on a heat exchange surface. The coating has a lower surface tension than water, to repel water and prevent the formation of water condensation on the surface. For example, the coating can be a fluoropolymer such as 1,1,2,3,3,3 hexafluoropropene.

2 Claims, 3 Drawing Sheets

(51) Int. Cl.
*C09K 3/00* (2006.01)
*F25D 21/04* (2006.01)
*B64D 15/00* (2006.01)
*F28F 19/00* (2006.01)
*F25B 21/02* (2006.01)

(56) References Cited

U.S. PATENT DOCUMENTS

| | | | | |
|---|---|---|---|---|
| 4,776,391 | A * | 10/1988 | Warner | 165/133 |
| 4,946,903 | A * | 8/1990 | Gardella et al. | 428/409 |
| 5,853,894 | A * | 12/1998 | Brown | 428/422 |
| 5,883,161 | A * | 3/1999 | Wood et al. | 524/48 |
| 5,985,454 | A * | 11/1999 | McMordie et al. | 428/413 |
| 6,133,389 | A * | 10/2000 | Anolick et al. | 526/206 |
| 6,159,547 | A * | 12/2000 | McMordie et al. | 106/14.12 |
| 6,767,587 | B1 * | 7/2004 | Brown | 427/393.4 |
| 6,863,984 | B2 * | 3/2005 | Hoke et al. | 165/133 |
| 6,972,145 | B1 * | 12/2005 | Ruid et al. | 138/145 |
| 6,974,551 | B2 * | 12/2005 | Zaghib et al. | 106/13 |
| 7,217,754 | B2 * | 5/2007 | Koloski et al. | 524/430 |
| 7,268,179 | B2 * | 9/2007 | Brown | 524/548 |
| 7,323,285 | B2 * | 1/2008 | Foster et al. | 428/409 |
| 7,571,695 | B2 * | 8/2009 | Taylor et al. | 116/216 |
| 7,579,056 | B2 * | 8/2009 | Brown | 428/35.7 |
| 7,781,027 | B2 * | 8/2010 | Brown | 427/487 |
| 7,881,871 | B2 * | 2/2011 | Gorse | 424/179.1 |
| 7,887,790 | B2 * | 2/2011 | Ober et al. | 424/78.09 |
| 7,999,013 | B2 * | 8/2011 | Brown | 522/1 |
| 8,049,022 | B2 * | 11/2011 | Hierse et al. | 554/67 |
| 8,067,625 | B2 * | 11/2011 | Hierse et al. | 554/231 |
| 8,168,264 | B2 * | 5/2012 | Brown | 427/508 |
| 8,221,870 | B2 * | 7/2012 | Brown | 428/156 |
| 8,653,213 | B2 * | 2/2014 | Brown | 526/245 |
| 2006/0024504 | A1 * | 2/2006 | Nelson et al. | 428/409 |
| 2009/0312432 | A1 * | 12/2009 | Hierse et al. | 106/13 |
| 2010/0243221 | A1 * | 9/2010 | Yamasaki et al. | 165/133 |

FOREIGN PATENT DOCUMENTS

| | | |
|---|---|---|
| JP | 10205916 | 8/1998 |
| WO | 94/20801 | 9/1994 |

OTHER PUBLICATIONS

Lexmond, Axel Sebastiaan; Drop pinch-off from hydrophobic heat exchanger plates, Technische Universiteit Eindhoven, 2003 Section 1.2—abstract available from ,http://www.mate.tue.nl/mate/showabstract.php/3980[viewed Feb. 22, 2008].

* cited by examiner

HEAT EXCHANGE SURFACE INCLUDING A HYDROPHOBIC COATING LAYER

CROSS REFERENCE TO RELATED APPLICATIONS

This application claims priority from U.S. Provisional Patent Application No. 60/603,930, filed Aug. 24, 2004. The contents of these applications are incorporated herein by reference.

FIELD OF THE INVENTION

This invention relates to devices and methods for preventing ice buildup and articles of manufacture that are resistant to ice buildup, such as heat exchangers and aircraft control and lift surfaces.

STATEMENT REGARDING FEDERALLY FUNDED RESEARCH AND DEVELOPMENT

N/A

BACKGROUND OF THE INVENTION

The present invention relates to devices and methods for preventing ice build-up and articles of manufacture that are resistant to ice buildup. Devices which experience ice build up include analytical devices which require temperature control. Some instruments employ peltier devices with heat sinks and heat exchangers. Heat exchangers are typically made of metals due to the metal's high thermal conductivity. As these devices withdraw heat from the air circulating around the heat exchangers, the temperature of the heat exchangers is lowered. The temperature can be lowered such that the moisture in the air, water, condenses on the surfaces. The condensed water lowers the efficiency of the heat exchanger. And, a cycle develops in which the temperature of the heat exchanger is driven lower and lower. Eventually, a layer or block of ice forms on the heat exchanger. In order to restore the efficient operation of the heat exchanger, the ice is removed.

Dehumidiers, air conditioners, refrigerators and freezers have problems with ice build-up. Ice will form in freezers on any metal surface. For example, ice will form on metal shelving and metal containers and if the freezer has coils, such coils will develop a layer of ice. The ice can build up in freezers and reduce available useable space and reduce the efficiency.

Icing on aircraft control and lift surfaces is a problem. As used herein, control surfaces are surfaces associated with changing the course of an aircraft. Lift surfaces refer to wings and the like. Ice forms and adheres to the control and lift surfaces due to temperature and aerodynamic effects. Icing on aircraft has been associated with numerous catastrophic events.

It is desirable to have simple means to reduce icing problems in equipment and aircraft.

SUMMARY OF THE INVENTION

Embodiments of the present invention are directed to devices and methods for preventing ice buildup and articles of manufacture that are resistant to ice buildup. The devices and articles of manufacture of the present invention comprise heat exchangers, refrigeration and freezing equipment and aircraft control and lift surfaces. One embodiment of the present invention features a device for withdrawing heat energy from air. The device has a heat exchange surface for absorbing heat energy and a layer of a substantially hydrophobic coating. This layer is affixed to or on the heat exchange surface. The coating has a lower surface tension than water, to repel water and prevent the formation of water condensation on said surface. The low level of condensation prevents ice build-up.

A preferred coating is a fluoropolymer. A particularly preferred fluoropolymer is derived from monomers of polyfluoroethylene and polyfluoropropene. Preferably, the polyfluoroethylene and polyfluoropropene have three to six fluorine atoms. A particularly preferred polyfluoropropene is 1,1,2,3,3,3 hexafluoropropene.

Preferably, the heat exchange surface is a condensation, refrigeration or freezing coil or a heat exchanger associated with a Peltier device.

Preferably, the heat exchanger surface is arranged vertically. Droplets forming on the coating are allowed to quickly descend the face of the surface and drip due to the low contact angle.

A further embodiment of the present invention is directed to a method of preventing icing on heat exchanging surfaces on peltier devices and refrigeration and freezer components. The method comprises the steps of placing a layer of a substantially hydrophobic coating on the heat exchanging surface. The coating has a lower surface tension than water, to repel water and prevent the formation of condensate on the surface of heat exchanging surface.

A preferred coating is a fluoropolymer. A particularly preferred fluoropolymer is derived from monomers of polyfluoroethylene and polyfluoropropene. Preferably, the polyfluoroethylene and polyfluoropropene have three to six fluorine atoms. A particularly preferred polyfluoropropene is 1,1,2,3,3,3 hexafluoropropene.

As used herein, refrigeration and freezer components include industrial and household refrigerators, freezers, dehumidifiers and air conditioners.

Embodiments of the present invention have application in which a component, part or element of an apparatus is subject to icing. For example, without limitation, one embodiment of the present invention is directed to a freezer component that is resistant to icing. The freezer component has comprising a surface having a coating having a lower surface tension than water, to repel water and prevent the formation of water condensation on said surface.

Typical aluminum and steel components such as trays and shelves of freezers and the like are particularly susceptible to icing.

A preferred coating is a fluoropolymer. A particularly preferred fluoropolymer is derived from monomers of polyfluoroethylene and polyfluoropropene. Preferably, the polyfluoroethylene and polyfluoropropene have three to six fluorine atoms. A particularly preferred polyfluoropropene is 1,1,2,3,3,3 hexafluoropropene.

A further embodiment of the present invention comprises a device for controlling temperature, such as Peltier heat exchange device. The device comprises a heat sink and one or more exchanger fins in thermal communication with the heat sink. The exchanger fins have a coating having a lower surface tension than water, to repel water and prevent the formation of condensate on said surface.

Preferably, the heat sink is in thermal communication with a Peltier heat exchange device. And, preferably the one or more fins have surfaces arranged vertically.

A further embodiment of the present invention is directed to aircraft having lift and control surface with potential for icing. The aircraft has control and lift surfaces having a coating having a lower surface tension than water, to repel water and prevent the formation of condensate on said surface.

As used herein, the term control surfaces comprise surfaces which adjust to change the direction of the aircraft. The lift surfaces are surfaces that are associated with lifting the aircraft such as wings and the like.

A preferred coating is a fluoropolymer. A particularly preferred fluoropolymer is derived from monomers of polyfluoroethylene and polyfluoropropene. Preferably, the polyfluoroethylene and polyfluoropropene have three to six fluorine atoms. A particularly preferred polyfluoropropene is 1,1,2,3,3,3 hexafluoropropene.

Embodiments of the present invention are directed to a method of maintaining an aircraft to reduce icing on control and lift surfaces. The methods comprising the steps of applying a coating having a lower surface tension than water, to repel water and prevent the formation of condensate on said surface.

A preferred coating is a fluoropolymer. A particularly preferred fluoropolymer is derived from monomers of polyfluoroethylene and polyfluoropropene. Preferably, the polyfluoroethylene and polyfluoropropene have three to six fluorine atoms. A particularly preferred polyfluoropropene is 1,1,2,3,3,3 hexafluoropropene.

Preferably, the coating is applied as a paint-like coating. Such a paintlike coating preferably has an indicator pigment. The indicator pigment indicates which surface have received the composition. And, upon drying, the indicator pigment indicates wear and the condition of the coating.

These and other features and advantages will be apparent to those skilled in the art upon viewing the drawings and reading the detailed description of the invention that follows.

DETAILED DESCRIPTION OF THE INVENTION

Embodiments of the present invention are directed to devices and methods for preventing ice buildup and articles of manufacture that are resistant to ice buildup. Individuals skilled in the art will recognize that the present invention has broad application to any device in which icing may be a problem. For example without limitation, embodiments of the present invention have application with respect to heat exchangers, refrigeration and freezing equipment and aircraft control and lift surfaces. Heat exchangers are used in the analytical devices and medical field.

Figure 1:
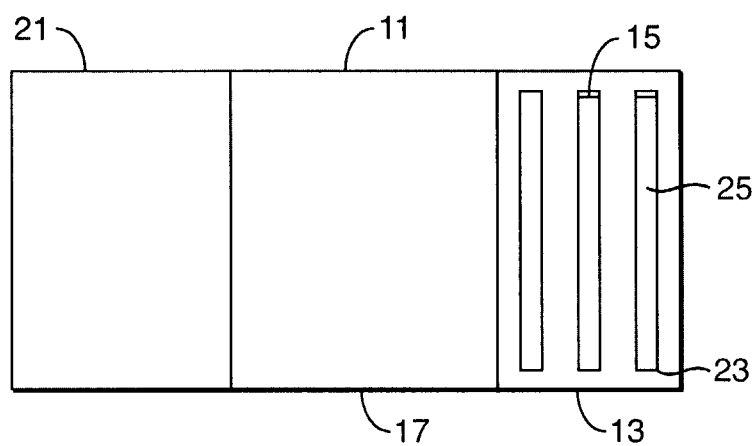
FIG. 1 depicts a device embodying features of the present invention in the form of a peltier heat exchange device.

Turning now to FIG. 1, a device for withdrawing heat energy from air, is depicted by the numeral 11. The device 11 comprises the following major elements: a heat exchanger assembly 13, a layer 15, a heat sink 17 and a peltier device 21. The peltier device 21 uses electric current to withdraw energy from the heat sink 17. The heat sink is in thermal communication with the heat exchanger assembly 13. Peltier devices, heat sinks and heat exchange assemblies are well known in the art and are available from numerous vendors.

As used herein, the term in "thermal communication" means that there is an exchange of thermal energy.

In the context of this discussion, the Peltier device 21 is used to heat an object of interest [not shown]. Thus, heat is withdrawn from the heat sink 17 and the heat exchanger assembly 13. As thermal energy is withdrawn from the heat exchanger assembly 13, the temperature of the heat exchanger assembly 13 will be lowered.

Heat exchanger assembly 13 has fins 23 which provide a heat exchange surface 25. The one or more fins 23 absorbs heat energy from the air around the heat exchange surface 25. Air around the heat exchange surface 25 experience a lowering of temperature. Water vapor tends to condense around the heat exchange surface 25 forming droplet, and if the air and the heat exchange surface is low enough, ice. The water and the ice are poor heat sinks. Thus, the Peltier device 21 will be powered to extract more heat from the heat sink 17 and heat exchange assembly 13. The temperature of the heat exchange surface 25 will be lowered further and additional ice will form.

Figure 2:
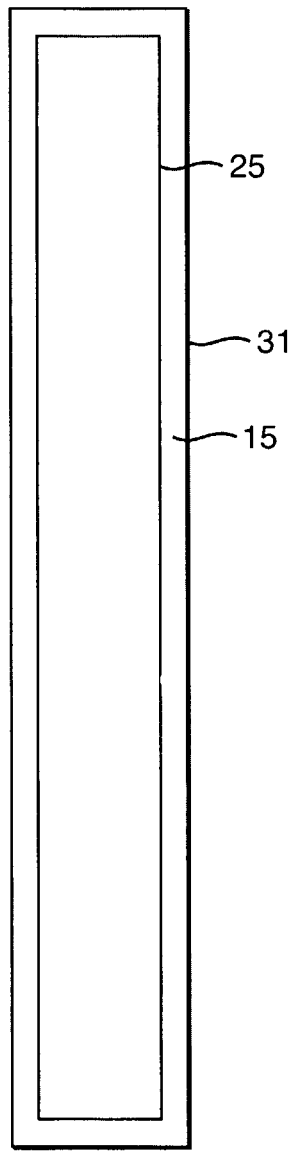
FIG. 2 depicts in cross section a heat exchanger fin having features of the present invention.

Turning now to FIG. 2, embodiments of the present invention feature a heat exchange surface 25 and a layer 15 of a substantially hydrophobic coating. The layer 15 is affixed to or on the heat exchange surface 25 as paint. The layer 15 has a lower surface tension than water, to repel water and prevent the formation of water condensation on the heat exchange surface 25 and more precisely, on the interface 31 of the layer 15 and the air. The low level of condensation prevents ice build-up.

Preferably, the layer 15 has an interface 31 with a surface energy below the surface tension of water, 75.05 dynes/cm at 20 degree centigrade. Preferably, the interface 31 has a contact angle with water less than 90 degrees.

A preferred coating is a fluoropolymer. A particularly preferred fluoropolymer is derived from monomers of polyfluoroethylene and polyfluoropropene. Polyfluoroethylene and polyfluoropropene compounds are available from several venders. A common trade name associated with polyfluoroethylene compounds is TEFLON (Dupont, Del., USA). Preferably, the polyfluoroethylene and polyfluoropropene have three to six fluorine atoms. A particularly preferred polyfluoropropene is 1,1,2,3,3,3 hexafluoropropene.

The preferred polyfluoropropene, 1,1,2,3,3,3 hexafluoropropene, is a 0.1-5% solution in a fluorocarbon solvent. A 0.2% solution is sold under the trade name NYE BAR-TYPE Q (Nye Lubricants, Inc., Fairhaven, Mass., USA). The solution is applied to the heat exchange surface 25 by dipping the heat exchange surface into the 1,1,2,3,3,3 hexafluoropropene solution, brushing the solution onto the heat exchange surface 25 or by spraying the solution onto the heat exchange surface 25. The carrier solvent evaporates in approximately five minutes. The heat exchange surface 25 is, preferably, heated for approximately fifteen minutes at 100 degrees centigrade to create a more durable abrasion resistant layer 15. Layers 15 of 1,1,2,3,3,3 hexafluoropropene are colorless.

Preferably, the heat exchanger surface 25 is arranged vertically. Droplets forming on the coating are allowed to quickly descend the face of the surface and drip due to the low contact angle. The droplets will not adhere to the heat exchange surface 25 and form ice. The efficiency of the heat exchange surface 25 will remain substantially unchanged even in humid conditions which favor the formation of ice.

The heat exchange surface 25 has been described with respect to a Peltier device 21 as depicted in FIG. 1. However, individuals skilled in the art will readily recognize that the Peltier device 21 and heat sink 17 and heat exchange assembly 15 could comprise condensation, refrigeration or freezing coil or other heat exchanger devices [not shown]. Condensation, refrigeration and freezer coils and components include coils and components of industrial and household refrigerators, freezers, dehumidifiers and air conditioners.

Embodiments of the present invention have application in which a component, part or element of an apparatus is subject to icing due to the element of apparatus acting as a heat exchange surface 25. Turning now to FIG. 2, for example, without limitation, shelves, trays, compartment dividers and walls act as heat exchange surfaces 25. Such shelves, compartment dividers and walls are often made of metal, for example aluminum. During the operation of the freezer, the shelves, compartment dividers and walls are maintained at freezing temperatures. Upon exposure to ambient air having a higher vapor pressure, these surface absorb thermal energy from such air and water condenses forming a layer of ice.

One embodiment of the present invention is directed to a freezer component that is resistant to icing. The freezer component has a surface 25 having a layer 15 having a lower surface tension than water, to repel water and prevent the formation of water condensation on said surface.

The use of the invention is described with respect to a method of preventing icing on heat exchanging surfaces on peltier devices, condensation, refrigeration and freezer components. The method comprises the steps of placing a layer 15 of a substantially hydrophobic coating on the heat exchange surface 25. The layer has a lower surface tension than water, to repel water and prevent the formation of condensate at the interface 31 of the layer 15 and the air.

A preferred layer 15 is a fluoropolymer. A particularly preferred fluoropolymer is derived from monomers of polyfluoroethylene and polyfluoropropene. Preferably, the polyfluoroethylene and polyfluoropropene have three to six fluorine atoms. A particularly preferred polyfluoropropene is 1,1,2,3,3,3 hexafluoropropene.

Figure 3:
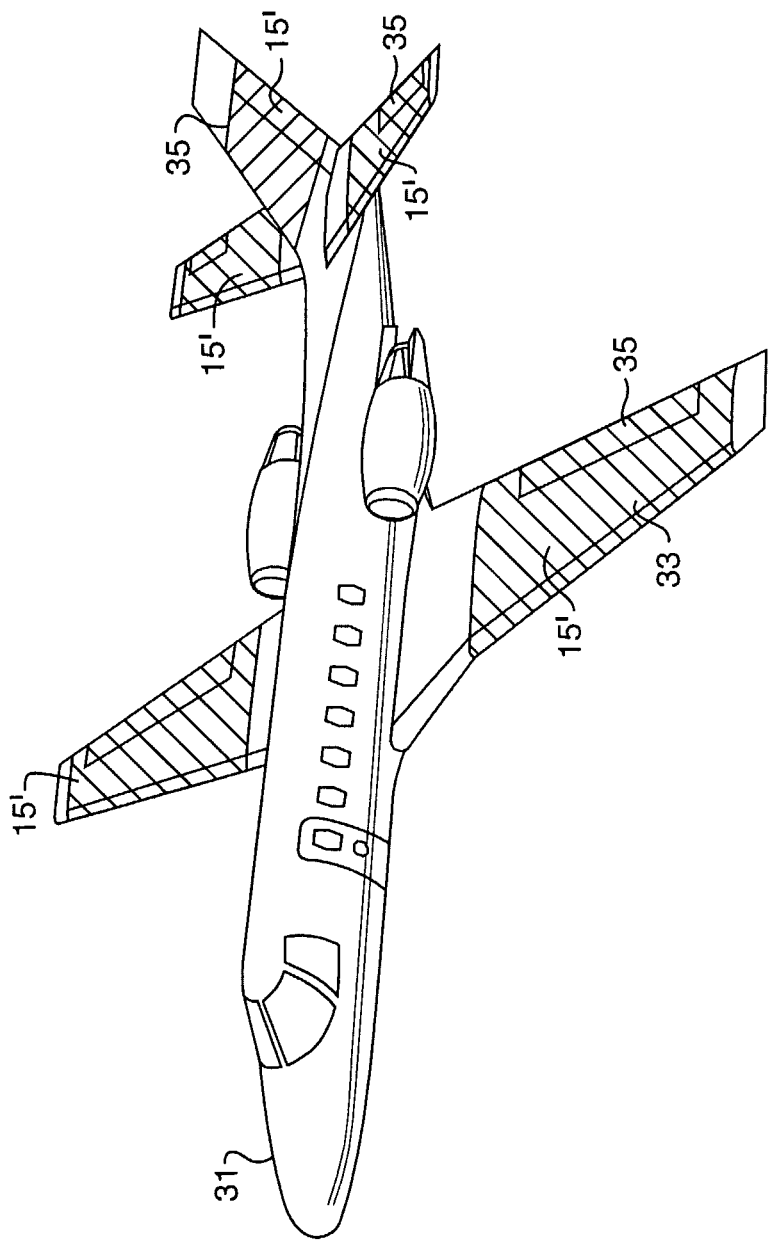
FIG. 3 depicts an aircraft embodying features of the present invention.

Turning now to FIG. 3, a further embodiment of the present invention is directed to preventing ice build-up on lift and control surfaces of aircraft. An aircraft 31 having lift surfaces 33 and control surface 35 is depicted. The lift surfaces 33 and the control surfaces 35 have potential for icing. Ice build-up on aircraft lift surfaces 33 and control surface 35 has been identified as potential causes of serious aircraft mishaps. Ice builds up adding weight to the aircraft 31. The contours [not shown] of lift surfaces 33 are altered and provide less lift. Control surfaces 35 which move in response to operator direction may fail to move.

As depicted, the aircraft has control surface 35 and lift surfaces 33 have a layer 15' having a lower surface tension than water, to repel water and prevent the formation of condensate on the control surfaces 35 and lift surfaces 33.

As used herein, the term control surfaces comprise surfaces 35 which adjust to change the direction of the aircraft. The lift surfaces are surfaces that are associated with lifting the aircraft such as wings and the like 33.

A particularly preferred polyfluoropropene is 1,1,2,3,3,3 hexafluoropropene. This preferred polyfluoropropene, can be brushed, sprayed or otherwise applied to the control surfaces 35, and or lift surfaces 33. A preferred layer has a indicator pigment that suggests wear of the layer.

The operation of the present invention is described with respect to a method of maintaining an aircraft 31 to reduce icing on control surfaces 35 and lift surfaces 33. The method comprises the steps of applying a coating having a lower surface tension than water, to repel water and prevent the formation of condensate on control surfaces 35 and/or lift surfaces 33.

Preferably, the coating is applied as a paint-like coating. Such a paintlike coating preferably has an indicator pigment. The indicator pigment indicates which surface have received the composition. And, upon drying, the indicator pigment indicates wear and the condition of the coating.

Thus, embodiments of the present invention have been described with respect to the preferred devices, apparatus and methods depicted in the drawings and this detailed discussion with the understanding that the present invention can be modified and altered without departing from the teaching herein. Therefore, the present invention should not be limited to the precise details set forth herein but should encompass the subject matter of the following claims and their equivalents.

What is claimed:

1. A device for withdrawing heat energy from air comprising:
   a. a heat exchange surface for absorbing heat energy; and
   b. a hydrophobic coating layer on the heat exchange surface, the hydrophobic coating layer consisting essentially of a fluoropolymer of polyfluoropropene, the hydrophobic coating layer having a lower surface tension than water to repel water and prevent the formation of water condensation on the heat exchange surface.

2. The device of claim 1 wherein the polyfluoropropene is 1,1,2,3,3,3 hexafluoropropene.

* * * * *